Patented Mar. 16, 1943

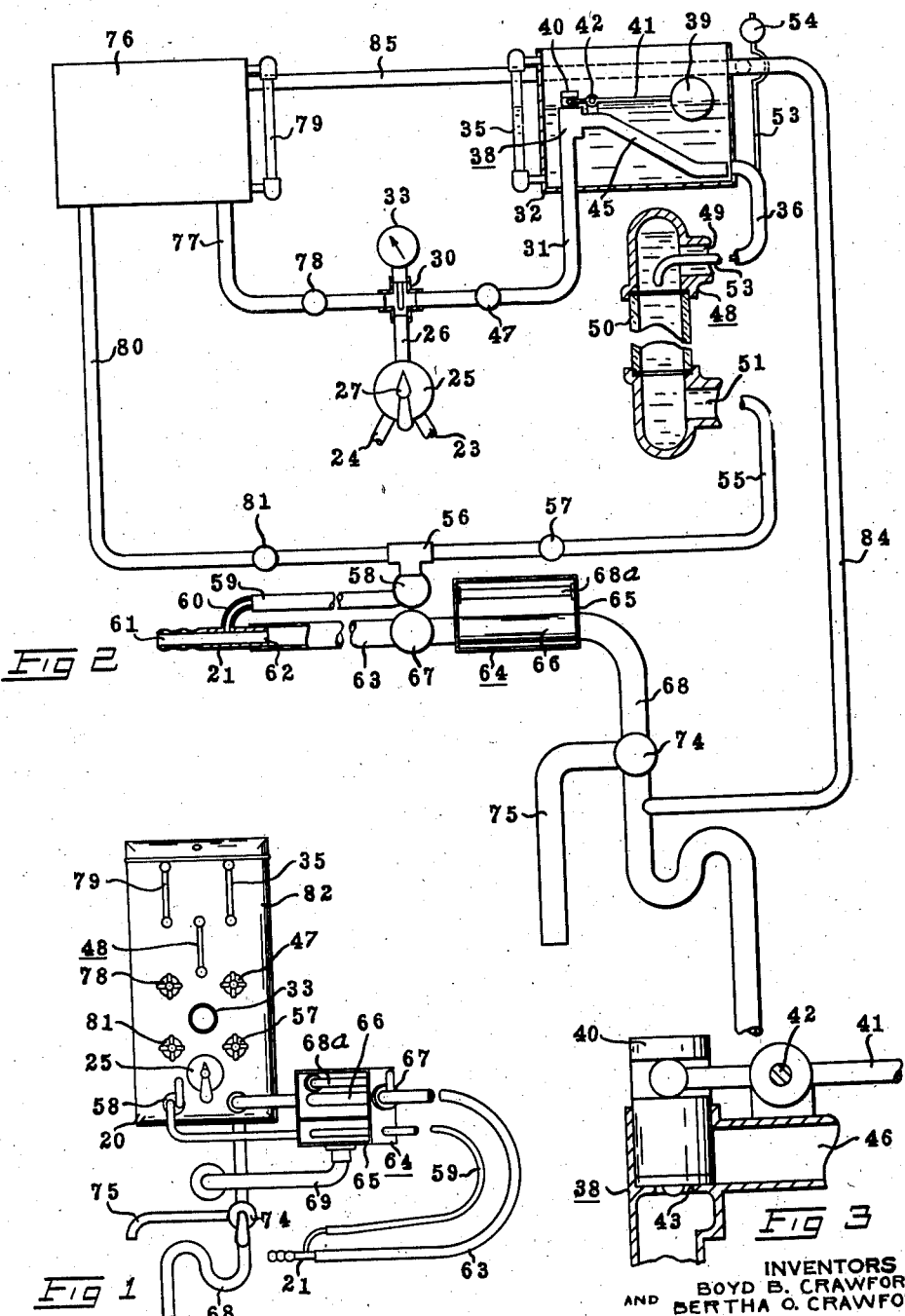

2,313,805

UNITED STATES PATENT OFFICE 2,313,805

COLONIC IRRIGATOR

Boyd B. Crawford and Bertha Olive Crawford, Independence, Mo.

Application November 8, 1941, Serial No. 418,402

2 Claims. (Cl. 128—227)

The present invention relates to a colonic irrigator and the like.

An object of the invention is to provide a mechanism for injecting a cleansing or medicated liquid into the colon under a substantially constant pressure, and which mechanism intermixes a gas, such as air, with the liquid.

Another object of the invention is to provide a conduit for directing the liquid to the injecting nozzle of the irrigator, which conduit has a transparent wall that is located intermediate the point of introduction of the gas into the liquid and the injecting nozzle so that the operator of the irrigator can observe the stream of gas entering the liquid.

Still another object of the invention is to provide a colonic irrigator apparatus that maintains a substantially constant pressure on the liquid directed to the nozzle thereof and in which the temperature of the liquid supplied to the nozzle can be readily controlled, which apparatus includes a receptacle having an outlet that is connected by a conduit with the nozzle, a conduit for discharging tempered liquid into the receptacle adjacent and directly into the outlet, and a device for controlling the flow of liquid into the receptacle for maintaining a substantially constant liquid level above the outlet.

Further objects and advantages will be apparent from the following description, reference being had to the accompanying drawing where a preferred form of embodiment of the present invention is clearly shown.

In the drawing:

Fig. 1 is a perspective view of a colonic irrigator apparatus;

Fig. 2 is a diagrammatic showing of the apparatus; and,

Fig. 3 is a diagrammatic showing of a valve mechanism, a portion of the valve mechanism being shown in section.

Referring to the drawing, for the purpose of illustrating the invention, we have shown a colonic irrigating apparatus 20. The apparatus comprises an injector nozzle 21 for directing liquid into the colon, and mechanism for controlling the supply of liquid, such as water or medicated liquid, to the nozzle. Preferably, the apparatus 20 includes means for entraining air in the water supplied to the nozzle, since it has been discovered that the presence of air in the water is particularly beneficial in treating and cleansing the colon.

In the present embodiment, water is supplied to the apparatus 20 by pipes 23 and 24, one of which pipes is connected with a suitable source of hot water, and the other pipe is connected with a source of relatively cool water. The water from the pipes 23 and 24 is directed into an automatic mixing valve 25. The valve 25 automatically mixes the water so that water having a predetermined mean temperature is discharged from the valve through a pipe 26. The valve 25 is adjustable by a handle 27 for controlling the temperature of the water discharged therefrom. Valves similar to valve 25 are well known and, therefore, the details of the valve are not shown.

Pipe 26 is connected with a pipe junction 30 and a pipe 31 is connected to the junction and extends into a tank 32. Preferably, a gas type thermometer 33 is mounted in the junction 30 for indicating the temperature of the water discharged from the valve 25. The tank 32 is provided with a sight glass 35 for indicating the level of the water in the tank, and an outlet is formed adjacent the bottom of the tank. A pipe 36 is connected to the tank at the outlet.

The pipe 31 extends through an opening in the bottom wall of the tank and upwardly to the inlet of a valve 38. The valve 38 is controlled by a float 39, and comprises a valve member 40 that is actuated by a rod 41 connected with the float 39. The rod 41 is pivoted at 42 so that as the float 39 rises, the valve member 40 is moved toward the seat 43 of the valve and when the float descends, the valve member 40 is moved from the seat 43. A pipe 45 is connected to the outlet 46 of the valve 38, and the end of the pipe 45 is aligned with the end of the pipe 36. The ends of the pipes 45 and 36 are spaced from one another so that water discharged from the pipe 45 can enter the tank 32. It is apparent that the float operated valve 38 will cause a substantially constant level of water to be maintained in the tank and that water discharged from the pipe 45 will directly enter the pipe 36. The constant head of water in the tank maintains the water pressure in pipe 36 substantially constant and the temperature of the water entering the pipe 36 from pipe 45 is substantially unaffected by the temperature of water in the tank. Preferably, a manual valve 47 is provided in the pipe 31 for controlling the flow of water to the tank.

The pipe 36 is connected with a sight glass device 48, which device includes an inlet 49, a transparent tubular section 50, which is preferably formed of glass, and an outlet 51. A tube 53 is extended through an opening in the wall of the tube 36 and extends into the inlet 49 of the sight glass 48. The end of the tube is directed downwardly, but terminates adjacent the end of the transparent section 50. The upper end of the tube 53 extends above the tank 32 and is open to the atmosphere, although, it could be connected with a source of any suitable gas, such as oxygen. Preferably, a hand operated valve, indicated at 54, is provided in the tube. When water flows through the pipe 36 from the tank 32 into the sight glass device 48, air is drawn from the atmosphere through the tube 53 and is entrained in the water adjacent the top of the transparent section 50. Thus, the operator of the irrigating apparatus can observe the stream of air as it enters the water and can regulate the valve 54 so that the proper amount of air is entrained.

One end of a pipe 55 is connected to the outlet 51 of the sight glass device 48 and the opposite end is connected to a T junction 56. Preferably, a valve 57 is provided in the pipe 55 for controlling the flow of water from the tank 32. A quick acting manually operated valve 58 is connected to the lower outlet of the T junction 56 and a flexible hose 59 is connected at one end to the outlet of the valve 58 and the opposite end is connected to an inlet 60 of the nozzle 21.

The nozzle 21 is adapted to discharge the water through the end 61 thereof, into the colon and water from the colon passes back through the nozzle and out the end 62 thereof. A flexible tubing 63 is connected to the nozzle 21 at the end 62 for directing water and material carried thereby from the colon through a sight glass device 64.

The device 64 comprises a rectangular frame 65 which, in this embodiment, is shown supported by a wall bracket 69. The frame 65 has a transparent tube 66 mounted therein. One end of the tube 66 is connected to a valve 67, and, the tubing 63 is connected to the inlet of the valve 67. The opposite end of the transparent tube 66 is connected with a sewer pipe 68. Preferably, a tubular shaped lamp 68a is mounted in the frame 65 for illuminating the tube 66 so that the operator can observe the liquid passing through the tube. The valve 67 is manually controlled and it may be closed when water is injected into the colon through the nozzle.

Preferably, a manually operated valve 74 is connected in the sewer pipe 68 so that liquid flowing to the sewer can be diverted through the tube 75 to a receptacle for obtaining specimens of the liquid.

It is often desirable to irrigate the colon with a water having a medicinal agent added thereto, and for this purpose we have provided a tank 76. This tank is connected to the junction 30 by a pipe 77, which pipe has a valve 78 therein. The tank 76 is also provided with a sight glass 79 for indicating the quantity of liquid therein. An outlet is provided in the bottom of the tank 76 and a pipe 80 is connected to the tank at the outlet thereof. The opposite end of the pipe is connected to the T junction 56. Preferably, a valve 81 is located in the pipe 80.

When it is desirable to supply only medicated water to the nozzle 21 valves 47, 57 and 81 are closed and a predetermined quantity of a suitable medicine, for example potassium permanganate, is then placed in the tank 76. The tank is filled with water to the proper level by opening the valve 78. The flow of water into the tank 76 which contains the medicine causes the medicine and water to be thoroughly mixed. When the proper amount of water has entered the tank 76, the valve 78 is closed and valve 81 opened. The medicated water then flows through pipe 80, valve 81, T fitting 56, valve 58 and tube 59 to the nozzle 21.

When it is desirable to use only aerated water, valves 47 and 57 are opened and valves 78 and 81 are closed. Preferably, during the time that the colon of a patient is being treated, the water, either aerated or medicated, flowing to the nozzle 21 is controlled manually by the valve 58.

Preferably, an overflow pipe 84 is provided for the tank 32, one end of the pipe being attached to an opening in the tank adjacent the top thereof and the other end of the pipe is connected to the sewer pipe 68. An overflow is provided for the tank 76 by connecting one end of a pipe 85 to an opening in the tank adjacent the top thereof and connecting the opposite end of the pipe to pipe 84.

We have found that the tanks 32 and 76 should be located at such heights that the liquid level therein is approximately twenty-eight inches above the nozzle 21 when it is in use. Preferably, the tanks and certain of the pipes are mounted in a suitable casing 82, which casing can be mounted on a wall, for example.

By our invention, we have provided a colon irrigating apparatus by which the operator can readily determine and control the amount of air being entrained in the liquid supplied to the colon and which apparatus maintains a substantially constant liquid pressure and the temperature of which liquid can be readily controlled.

While the form of embodiment of the present invention as herein disclosed constitutes a preferred form, it is to be understood that other forms might be adopted, all coming within the scope of the claims which follow.

We claim:

1. In a colonic irrigator, or the like, a receptacle for receiving liquid, said receptacle having an outlet; a conduit for discharging liquid into the receptacle, said conduit being arranged to discharge liquid adjacent said outlet; and means responsive to the liquid level in the receptacle for controlling the flow of liquid through said conduit and into the receptacle.

2. In a colonic irrigator or the like, a nozzle; a liquid receptacle, said receptacle having an outlet adjacent the lower portion thereof; means forming a conduit connected at one end to the receptacle at the outlet thereof and at the opposite end with the nozzle; means, including a tube, for discharging tempered liquid to the receptacle, the outlet end of said tube being spaced from but adjacent and in alignment with the outlet of the receptacle for causing liquid discharged from the tube to directly enter the outlet opening; and means responsive to the liquid level in the receptacle for controlling the flow of liquid through the tube and into the receptacle, the last mentioned means being adapted to cause a predetermined liquid head to be maintained above the outlet of the receptacle.

BOYD B. CRAWFORD.
BERTHA OLIVE CRAWFORD.